United States Patent

[11] 3,607,190

[72] Inventor  Harvey Larry Penberthy
    5624 S. W. Admiral Way, Seattle, Wash. 98116
[21] Appl. No. 667,773
[22] Filed  Sept. 14, 1967
[45] Patented  Sept. 21, 1971

[54] METHOD AND APPARATUS FOR PREHEATING GLASS BATCH
13 Claims, 4 Drawing Figs.

[52] U.S. Cl. .................................................. 65/134,
    65/27, 65/335, 65/356, 106/47
[51] Int. Cl. ...................................................... C03b 5/16
[50] Field of Search ........................................ 65/17, 21,
    134, 33, 22, 27, 28, 135, 335, 347, 136; 214/182,
    31, 37; 263/27, 32; 106/70, 87, 47

[56] References Cited
UNITED STATES PATENTS

| | | | |
|---|---|---|---|
| 2,976,161 | 3/1961 | Smith | 106/47 |
| 3,291,585 | 12/1966 | Okamura | 65/27 |
| 3,397,972 | 8/1968 | Brichard | 65/335 X |
| 1,610,377 | 12/1926 | Hitner | 65/335 X |
| 1,970,112 | 8/1934 | Wadman | 65/347 X |
| 3,116,055 | 12/1963 | Pixley et al. | 263/32 |
| 3,150,991 | 9/1964 | Monks | 65/134 UX |
| 3,185,554 | 5/1965 | Sweo et al. | 65/17 |

OTHER REFERENCES

Y. E. Fein, Legkaya Promyshlennoste (Soviet Light Industry), " Employment of Sodium Sulphate in Glass-Boiling," No. 1 (1946) pp. 37–39. (translation available)

F. V. Tooley (editor) Handbook of Glass Manufacture, Ogden Publishing Co. New York, 1953. (page 242).

Primary Examiner—S. Leon Bashore
Assistant Examiner—J. B. Hardaway
Attorney—LeBlanc & Shur ABSTRACT: A rotary inclined preheated kiln receives batch from a hopper and preheats the batch within a temperature range, preferably between about 1200° F. to 1500° F. by a gas burner located at the discharge end of the kiln. Effluent gas from the furnace may also be fed into the kiln for preheating purposes and the combustion and/or effluent gases may then be discharged into pipes disposed in the supply hopper in heat exchange relation with the batch therein. The gases exiting from the kiln are maintained above the dew point. Another form provides a second hopper supplying refining agents to the preheated batch prior to charging in the furnace. A third form adds sulfate and amber glass to the batch whereby the iron sulfide in the amber glass is sealed in a glass matrix and is preserved for reaction with the sulfate to release sulfur dioxide for the refining process.

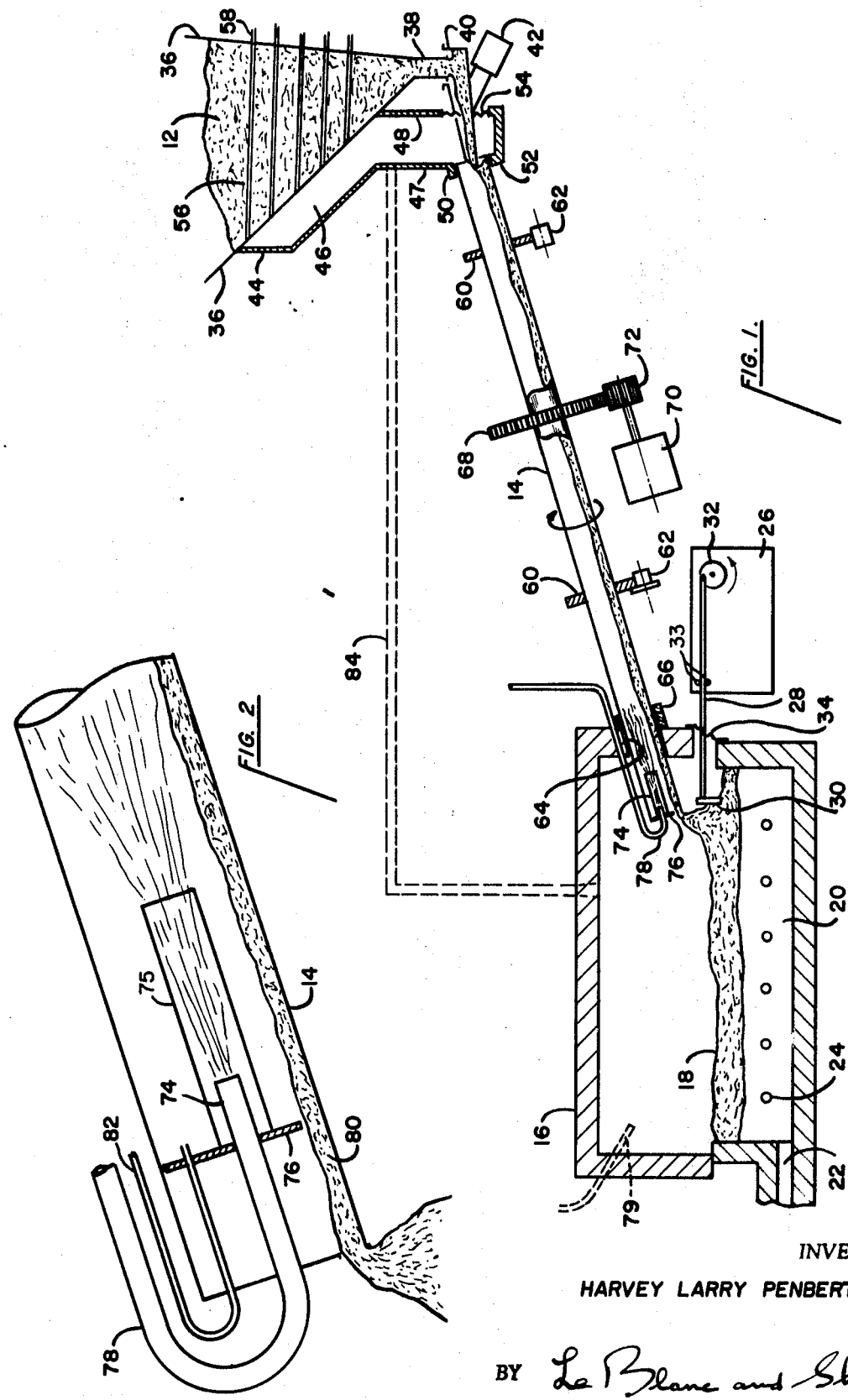

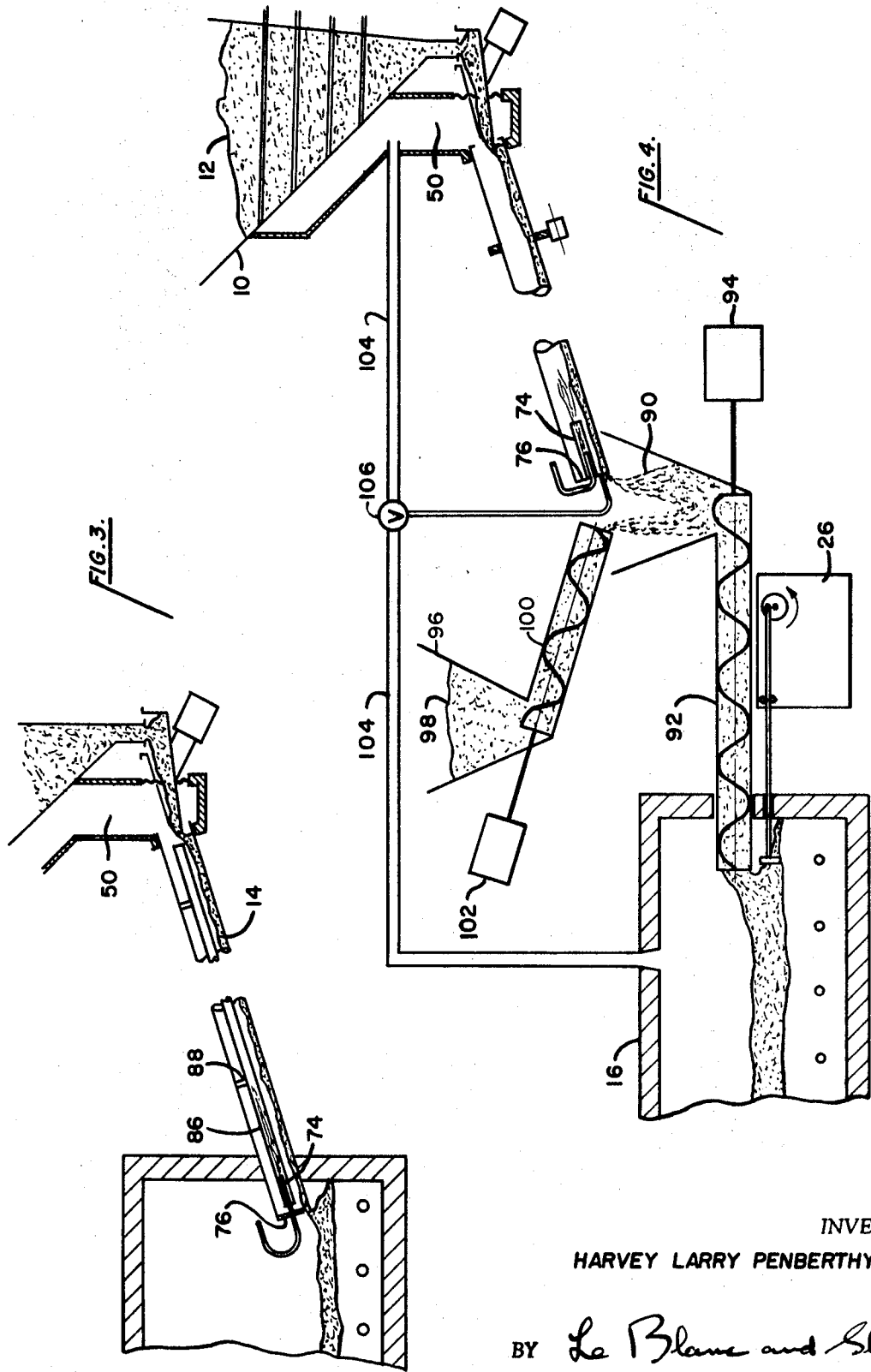

METHOD AND APPARATUS FOR PREHEATING GLASS BATCH

BACKGROUND OF THE INVENTION

This invention relates to the manufacture of glass and particularly to apparatus and methods for the efficient utilization of heat employed in glass manufacture using either fuel fired or electric furnaces.

Both fuel (gas, oil, or coal) fired and electric furnaces have been utilized in the manufacture of glass for some time, fuel fired furnaces being presently employed by the vast majority of glass manufacturers. Widespread employment of electric furnaces through out the glass industry has been resisted primarily because of the high heat cost per unit weight of glass produced, present electric power rates providing an electric heat cost of from two to three times greater than the heat cost of other fuels. Present electric glass furnaces, however, are highly efficient in comparison with fuel-fired glass furnaces and have a significantly smaller heat loss per unit weight of glass produced. Fuel fired furnaces, however, are presently preferred due to the inexpensiveness of the fuel (gas, oil, or coal) notwithstanding their relative inefficiency. The problem presents itself as one of reducing the cost of applied heat per unit weight of glass produced in both electric and fuel-fired furnaces, as well as reducing the cost of electric furnaces to a cost competitive with fuel-fired furnaces.

In the manufacture of glass, batch comprising the well-known constituents of the various types of glass compositions and from which the molten glass is formed is charged into the furnace on top of previously melted glass where it is subjected to melting, refining, working, and discharge. The melting of the batch is time consuming mainly because of the slow rate of heat transfer between the molten glass and the batch which, of course, limits the glass production rate for a given size furnace. Methods and apparatus for preheating the batch to reduce the net heat transfer required between the molten glass al., the raw batch to increase glass production have been proposed although, so far as is known, none of the glass furnaces utilizing such methods and apparatus is capable of attaining the efficiency realized by the glass furnace of the present invention.

Many previous proposals, in an attempt to preheat the batch from room temperature to one that reduces the temperature gradient in the furnace and which justifies the expense of the additional equipment and heat required, have preheated the batch by means of a gas-fired preheater kiln to temperatures above the liquefication temperatures of certain of the batch constituents. For example, prior proposals have provided preheat batch temperatures well above the melting temperatures (1,564° F.) of sodium carbonate in soda-lime batches. However, when the sodium carbonate melts, the batch becomes a sticky substance and tends to adhere to the preheat apparatus thus inhibiting the charging of the furnace. Additionally, when the batch becomes sticky, it tends to roll together in a cylinder. In this condition, there is heat transfer to the outside of the cylinder but heat does not transfer readily to the batch in the interior of the cylinder. Thus, while high preheat temperatures are theoretically desirable, their deleterious effects on the mechanical charging apparatus and the practical problems involved in providing efficient heat transfer in the batch more than offsets whatever thermal advantages can be attained.

U.S. Pat. No. 3,082,102 to Cole et al. contemplates the preheating of the batch to a temperature preferably upwards of 1,472° F. For a period of time sufficient to complete the main chemical reaction between sodium carbonate and silica wherein batch material is converted into solid state embryo glass in the preheater and subsequently charged into solid the furnace for melting and refinement. This latter proposal does not effectively utilize the heat since there are in effect two furnaces, one for maintaining the temperature in the preheater at reaction temperature and the other for the melting and refining. Moreover, for higher efficiency in the use of heat, this reaction ought to occur in the furnace since it is exothermic and, particularly with respect to electric furnaces, the heat thus generated should be applied to the heat chamber supplied by the heat generator which is economically most costly, i.e., the electric furnace.

Another prior example of batch preheating is described in U.S. Pat. No. 3,185,554 to Sweo et al., wherein the batch is preheated to a temperature in the range of 150° F. to 1200° F. to drive off combined volatiles, and is subsequently charged to the furnace, the upper limit of 1200° F. being critical since even the slightest incipient fusion could not be tolerated. Utilization of the heat in Sweo et al. is not particularly efficient or economical as the batch must remain in the preheater a sufficient time (4 hours) to drive off the volatiles (water, vapor, nitrates, carbonates, etc.), which time is longer than necessary to raise the temperature of the raw batch from room temperature to the upper critical limit of 1,200° F., resulting therefore in considerable heat loss. Moreover, by limiting the upper temperature in the preheater to 1,200° F. or below, a large heat gradient still remains between the molten glass and batch in the furnace and must be overcome by the heat applied by the furnace. Consequently, a greater heat input to the furnace is required and the cost of supplying such additional heat in the furnace is greater than the cost of supplying the same if it were provided in the gas-fired preheater, particularly with respect to the electric furnace. The larger heat gradient created by insufficient preheating in Sweo et al. also prolongs the melting time in the furnace, increases the rate of evolution of undesirable dust than would otherwise be the case with a smaller heat gradient, and consequently decreases the glass production rate.

Rotary preheater kilns, which are angled to the horizontal, have been used in the past for preheating batch prior to charging the same into glass furnaces, one of which is illustrated in the aforementioned patent to Cole et al. Combustion gases have also been utilized in rotary kilns to preheat the batch with the gas being introduced at the exit end of the kiln and flowing in a countercurrent opposite to the direction of flow of the batch. However, none of these proposals have been utilized to preheat batch to a temperature within a preferred predetermined range and for a duration such that not over 50 percent of the volatiles are driven off which, according to my invention, provides for the most efficient overall utilization of heat and provides significantly increased glass homogeneity.

Additionally, so far as is known, it has not heretofore been appreciated that the preheat treatment of the batch by the combustion atmosphere or gas tends to spoil the refining action within the furnace in applications where chemical agents are introduced into the batch to speed the elimination of seed or bubble. For example, the most common refining agent is arsenious oxide in conjunction with sodium nitrate, the latter giving off oxygen at low temperatures which is held by the arsenious oxide converted to the pentoxide. By raising the temperature of the batch above the decomposition temperature of sodium nitrate in contact with silica, the oxidizing feature of the nitrate is overcome by the preheat combustion gas. Accordingly, the arsenic of the batch cannot be oxidized by the nitrate to release oxygen in the refining stage with the result that much of the arsenic does not function as a refining agent. This inhibiting effect on the refining stage in the manufacture of glass caused by preheating the batch is a problem which has not heretofore been appreciated or solved so far as is known.

SUMMARY OF THE PRESENT INVENTION

In accordance with the present invention, there is provided a glass furnace in combination with a gas-fired rotary preheater kiln from which the batch is charged to the furnace, the kiln preheating the batch to within a preferred predetermined temperature range of about 1,200° F. to 1,500° F. This preferred temperature limitation has been determined by the discovery of the combined effect of a number of parameters for soda-lime glass batch and is an optimal average temperature limitation for these combined parameters, although optimal temperature consideration for certain of the parameters and other batches may dictate higher or lower temperatures, as the case may be. In reducing the temperature considerations for each parameter to define an average temperature range providing optimal efficiency (low heat cost per unit weight of glass produced, as well as maximum heat utilized per heat applied), consideration is given to, among other factors, the relative costs of providing the heat in both the electric furnace and the gas-fired preheater, the heat exchange rates between the batch and molten glass in the furnace and the batch and combustion atmosphere in the preheater kiln, the type and location of the chemical reactions produced, the effects of preheating the batch vis-a-vis the chemical reactions between their constituents, and the period of time during which the batch is in the preheater kiln.

One parameter is the liquefication temperature of the constituents of the batch. For example, as noted previously, sodium carbonate, in soda-lime batches, will liquefy at a temperature of approximately 1,564° F. If this temperature is exceeded, the reaction between sodium carbonate and silica will proceed and, since this reaction is exothermic, evolve heat which, it has been discovered, is better utilized in the furnace than in the preheater kiln, since this reduces the heat required in the furnace and the heat cost of the less economical electric source. Additionally, the liquefication of the constituents of the batch provides equipment design difficulties since the liquid materials tend to clog the preheater although minor batch constituents may liquefy without deleterious effects in the preheater since they melt and then combine with the unmelted batch to form solids again.

Efficient heat transfer from the combustion gases in the preheater kiln to the batch is another parameter determinative of the foregoing temperature limitation. In practice, batch remains granular to a temperature approximating 1,320° F. and, in this form, tumbles smoothly while traversing the rotary kiln. If this temperature is greatly exceeded, the batch becomes sticky and tends to roll in a loose agglomerate. In this stage, the batch tends to coat the interior of the kiln, thereby inhibiting heat transfer to the batch. Heat transfer is optimal only when the batch is free flowing and granular in form.

It has been found that, according to the present invention, when these and other parameters are fully considered, with respect to their largely unpredictable combined effect, a temperature for the output batch of about 1,350° F. provides optimal heat utilization efficiency for the combined furnace and preheater kiln, although efficiencies with preheater kiln operating temperatures being within a preferred temperature range of about 1,200° F. to 1,500° F. are not significantly less than the optimal efficiency. Part of the increase in efficiency can be attributed to the rapidity with which the batch is charged through the preheater kiln. Maximum utilization of heat in the preheater kiln is provided by substantially immediately discharging the batch from the kiln into the furnace upon attainment of the designed operating temperature in the kiln, preferably within the range of about 1,200° F. and 1,500° F. Heat loss is thus minimized.

Further efficiency in the maximum utilization of heat is provided by directing the effluent gas from the furnace to the preheater, thus placing such gas in heat exchange relation with the tumbling batch. This reduces the heat input to the preheater kiln and thus reduces the cost of the gas used therein. The residual heat in the combined combustion and effluent gas as it issued from the preheater kiln is further utilized as it is placed in heat exchange relation with batch in the preheater supply hopper. Such efficient use of these combined gases is made that they are exhausted to the atmosphere at approximately room temperature.

To minimize dusting in the preheater kiln, I prefer to rotate the kiln at relatively low speed, on the order of 5 to 20 r.p.m., according to the kiln diameter. One form of the present invention also provides a complete solution to the dusting problem by disposing a gas burner and conduit in the preheater kiln as to be coextensive therewith whereby heat transfer is accomplished by radiation through the conduit to the batch.

In another aspect of the present invention, the tendency of the preheat atmosphere in the preheater kiln to inhibit the refining action as noted previously is overcome. In one embodiment, the chemical agents which aid in the refining action, such as arsenic, and which are adversely affected by the premature application of heat thereto in the preheater kiln, are added to the raw glass batch after the bulk ingredients thereof have been preheated as before. In this manner, the refining agents are not exposed to the combustion atmosphere of the preheater kiln prior to their entry into the furnace and are added under normal atmosphere to the batch and the combination immediately charged into the furnace.

In another embodiment, the refining agents are comingled with the batch in a form which protects the refining agents against alteration by the combustion products of the preheater kiln. To accomplish this, sufficient sulfate is added to the batch so that not all of it is reacted by the combustion products. A small amount of amber glass in granulated form is also added to the batch, the amber glass containing a reducing agent, iron sulfide, which can react with sulfate to produce a sulfur dioxide in the refining process. The iron sulfide in the amber glass, however, is sealed in the glass matrix and the gaseous agents in the combustion products cannot rapidly penetrate the glass, thus preserving the sulfide during the preheating stage. Glasses other than amber, containing reducing agents, can be used, such as those containing calcium sulfide, entrapped carbon, etc.

Accordingly, it is a primary object of the present invention to provide a process and apparatus for the manufacture of glass wherein lower heat cost per unit weight of glass produced than heretofore available can be attained.

It is another object of the present invention to provide a process and apparatus for the manufacture of glass which efficiently and optimally utilizes the applied heat.

It is another object of the present invention to provide a process and apparatus for the manufacture of glass wherein the batch is preheated employing both combustion and effluent furnace gases.

It is a further object of the present invention to provide a process and apparatus for the manufacture of glass wherein the batch is preheated and the deleterious effects of preheating the refining agents is avoided.

It is still a further object of the present invention to provide a process and apparatus for the manufacture of glass wherein the batch is preheated within a temperature range of about 1,200° F. to 1,500° F. which range provides the greatest overall efficiency in utilizing the applied heat.

It is still another object of the invention to provide a high efficiency glass furnace wherein the heat in the furnace proper is provided by Joule effect electrodes.

It is still another object of the invention to provide a high efficiency glass furnace wherein the heat in the furnace is provided by combustion of fuel.

These and further objects and advantages of the present invention will become more apparent upon reference to the following specification, claims and appended drawings.

DESCRIPTION OF THE DRAWINGS

FIG. 1 is a fragmentary elevational view of an electric glass-melting furnace in combination with preheating apparatus constructed in accordance with the present invention and with parts broken away and shown in section for ease of illustration;

FIG. 2 is a fragmentary elevational view of the lower discharge end of the preheater apparatus illustrating the combustion means and a diluent air conduit;

FIG. 3 is a fragmentary elevational view of the electric glass-melting furnace in combination with another form of preheater assembly; and FIG. 4 is a fragmentary elevational view of another embodiment of an electric glass-melting furnace and preheater combination.

Referring to the drawing, and particularly FIG. 1, there is shown an exemplary general arrangement of the present invention comprising a hopper 10 for storing and supplying raw glass batch, indicated at 12, to a rotary tubular preheater kiln 14 which discharges preheated batch into an electric glass furnace 16. Batch 12 may comprise any of the well-known and conventional glass-forming compositions and the process and apparatus for the manufacture of glass according to the present invention are in no way dependent on any particular glass composition. Batch 12 is discharged in furnace 16 to form a batch blanket 18 which floats on previously melted glass, indicated at 20. Melting and refining are carried out in the furnace 16 and the molten glass is ultimately discharged through a submerged throat 22 to a working zone, not shown. Furnace 16 may be any conventional electric or fuel-fired glass furnace and in the illustrated form, comprises an electric furnace having a plurality of submerged Joule effect electrodes 24 formed of the usual graphite, platinum, molybdenum, or the like, for providing heat to the molten glass and batch blanket. A rabble 26, comprising a push rod 28 having a head portion 30 for pushing the batch away from the area at which it is deposited by kiln 14, is provided for distributing the batch blanket over the surface of molten glass 20. Rod 28 reciprocates longitudinally and head 30 oscillates vertically by eccentrically mounting the outer end of rod 28 on a crank wheel 32 which is suitably rotatably driven by means not shown, rod 28 being supported by and pivoted about a pair of rollers 33. The superstructure of furnace 16 is closed and sealed for reasons as will presently become clear and, accordingly, a diaphragm 34 is provided about rod 28 whereby effluent gas leakage is prevented. Other known types of batch chargers may be used.

Hopper 10 comprises the usual downwardly converging sidewalls 36 terminating in a throat area 38 for discharging batch 12 into an inclined feeder channel 40 which is suitably mounted for vibratory movement in a manner well known but not shown. A drive unit 42, of conventional construction, is provided to vibrate channel 40. An outer wall 44 is spaced from one of the hopper walls 36 and forms a plenum chamber 46 therewith. A lower leg portion 47 of wall 44 and an inner wall member 48 form a support yoke for the upper end of kiln 14 as well as a conduit 50 connecting plenum chamber 46 with the upper end of kiln 14. Bearing seals 52 are provided in lower wall 47 for rotatably supporting the upper end of kiln 14 and the discharge end of feeder channel 40 is disposed in registry with the open end of kiln 14 whereby granular batch 12 is discharged through throat 38 of hopper 10 onto vibrating channel 40 for deposit in the upper end of kiln 14. A suitable diaphragm 54 is provided about feeder channel 40 whereby conduit 50 and plenum chamber 46 are substantially airtight and in communication with kiln 14. A plurality of transversely extending, vertically spaced pipes extend between the opposite walls 36 of hopper 10 with corresponding ends thereof in communication with plenum chamber 46 and the opposite ends having discharge outlets 58 adjacent the opposite walls 36 for purposes as will presently become clear.

Rotary kiln 14 is provided with roller rims 60 bearing on suitably mounted rollers 62 such that kiln 14 is inclined at an angle to the horizontal whereby batch introduced at the upper end thereof from feeder channel 40 is gravity fed along rotary kiln 14 for discharge at its lower end into furnace 16. Rollers 62 have flange portions 63 which bear against roller rims 60 to prevent axial displacement of kiln 14 as it rotates. The lower end of rotary kiln 14 extends through a suitable opening 64 in an end of furnace 16 and a suitable bearing seal 66 is provided about opening 64 whereby kiln 14 is free to rotate and leakage of the effluent gases from the furnace is precluded. A drive gear 68 is fixed about kiln 14 and a conventional motor 70 and drive gear 72 drive kiln 14 in rotation. The speed of rotation of kiln 14 is preferably slow, on the order of 5 to 20 r.p.m., according to the kiln diameter, in order to effectively inhibit dusting of the batch as it is rotated and gravity fed along the length thereof.

It is a particular feature of the present invention that batch 12 is preheated in the rotary kiln 14 within a preferred temperature range of about 1,200° F. to 1,500° F. and for a limited duration in which only a small percentage, not exceeding 50 percent and preferably a much lower percentage, of the volatiles are driven off. To this end, a gas burner 74 is disposed within the discharge end of kiln 14 and supports a baffle plate 76 which is constrained from rotary movement with kiln 14 by a gas feedpipe 78 fixed through a suitable opening in the furnace wall. Baffle 76 is circular in form and has a lower cutaway portion along a chord line thereof to provide, with kiln 14, a reduced opening 80 through which the batch flows into furnace 16. As best seen in FIG. 2 and in order to promote combustion in the region of burner 74 and to shield batch 12 and kiln 14 from excessive temperatures which might result if the flame were allowed to burn directly in contact with them, a pipe 75 formed of heat resistant stainless steel is secured at one end to baffle plate 76 and extends about burner 74 for a distance in kiln 14 such that combustion is substantially complete before the combustion gases leave the opposite unsupported open end of pipe 75.

Preheat may also be applied to the batch in the preheater kiln 14 by providing a gas burner 79 directly through the sidewall of the furnace for combustion above batch blanket 18 as indicated by the dashed lines. The combustion gases and the effluent carbon dioxide gases from the batch will comingle and together pass into and traverse through the preheater kiln, the baffle 76 and burner 74, in this form, being eliminated to provide for free passage of the combined combustion gases and effluent carbon dioxide gases into the kiln 14.

The maintenance of the preheat temperature at or below 1,500° F. is particularly important for reasons noted previously and a preferred embodiment provides an air pipe 82 connecting through the furnace wall to a suitable air source with its open end mounted on baffle plate 76 whereby air issuing from pipe 82 dilutes the combustion atmosphere and cools the same below the critical temperature. The maintenance of these preferred temperature limitations in the preheater is desirable in order that the efficiency of the present invention be realized and comparable to existing gas fired furnaces. When operating within the defined temperature limits, batch 12 is maintained in granular form in the preheater providing for optimum heat transfer characteristics within the batch per se. Premature chemical reaction between the constituents of the batch is thus substantially avoided and the exothermic reactions of the fusion process are located in the furnace, thereby reducing the temperature gradient between the raw glass batch and the molten glass in the furnace which must be overcome by the more costly electrically generated heat. Moreover, by preheating the batch within this temperature range, the time required for melting and refining in the furnace is substantially reduced, the reduction being on the order of 50 percent of the time normally required in conventional furnaces. Additionally, it has been found that batch may be preheated to within these temperature limits in approximately 15 minutes time and it can be readily seen that extended preheating of the batch for a period of time, for example, longer than one-half hour, would considerably reduce the overall efficiency of the installation from an economic standpoint. When the batch is preheated to temperatures approaching the upper limit of the defined temperature range, fusion may start but the short period of time in which the batch is preheated precludes substantial fusion and the batch is discharged into furnace 16 in substantially granular form.

It is significant that only a very small percentage of the volatiles, including the carbonates, are driven off in the preheater kiln and that the same are retained until actual melting of the batch in the furnace. As is well known, batch mixtures are not perfectly mixed batches and there are regions therein which contain greater or smaller proportions of one batch ingredient than in other regions. The action of the volatiles, including the carbonates, in the melting zone agitate the mixture locally by the evolution of carbon dioxide bubbles. These bubbles, which are given off at the moment of decomposition of the carbonates, are significant in size, on the order of ⅛ to 1 inch and thus agitate the batch ingredients to further mix the batch thereby significantly promoting glass homogeneity. If the volatiles (water vapor, nitrates, carbonates, etc.) are, on the other hand, driven off in the preheater due to excessive exposure to the preheat, the desired mixing action in the furnace is lost.

A practical dimension for the rotary kiln is 36 inches in diameter by 24 feet long for the preheating of 117 tons of batch in 24 hours for the production of 100 tons of glass. The quantity of gas which is to be burned in the kiln in 1,170 cubic feet (1,059 B.t.u. per cubic foot) for each 2,340 pounds of soda-lime container batch which will result, after melting in 2,000 pounds of glass. This quantity of gas raises the temperature of batch from room temperature to about 1,500° F. which provides a calculated efficiency of 80 percent. This is to be contrasted with gas in an conventional regenerative furnace which is commonly burned at an efficiency of 20 percent. Thus, the process and apparatus of the invention introduces heat into batch at an efficiency four times greater than that which is customary in the industry.

In order to provide for further efficiency in the present furnace assembly, the heated effluent gases from the furnace which accumulate above batch blanket 18 may be fed into the rotary preheater kiln 14 through opening 80 (openings through baffle plate 76 for this purpose may also be provided) and comingle with the combustion atmosphere in direct heat transfer relation with the tumbling batch for the length of kiln 14. The effluent gas and combustion atmosphere exhaust from the upper end of kiln 14 in to conduit 50 and plenum chamber 46, flows through pipes 56 for discharge through outlets 58. The combustion and effluent gases are thus disposed in heat exchange relation with batch 12 in hopper 10 and the residual heat therein preheats the supply batch. The exhaust products issuing from outlets, including water condensate, are almost at room temperature and thus substantially all of the heat applied by the combustion gas in the preheater kiln and a large percentage of the heat applied by the electric furnace is recovered and effectively utilized. Of course, insulation may be applied about hopper 10, chamber 46, conduit 50, and the kiln per se as those skilled in the art will readily appreciate in order that further heat economies may be effected.

As a further feature of the invention, the temperature of the exit gases from kiln 14 into conduit 50 is maintained above the temperature at which water vapor from the combined combustion and effluent gases would condense on the batch in the kiln. Kiln 14 is therefore sufficiently short such that the gases do not give up sufficient heat to the batch as to drop at the kiln exit, to a temperature at which water vapor would condense.

To eliminate dusting of the batch entirely and still maintain a heat exchange relation between the combustion gases and the batch in the preheater kiln 14, there is shown in FIG. 3 another preheater kiln arrangement comprising a pipe 86 coextensive with kiln 14 and having its lower end closely spaced from baffle plate 76 and about burner 74, whereby the combustion gases from burner 74 pass within pipe 86 for the length of kiln 14 and discharge directly into conduit 50 without direct contact with batch 12. A plurality of longitudinally spaced brackets 88 connected to the kiln wall support pipe 86 in preferably concentric relation to and for rotation with kiln 14. In this manner, the combustion gases from burner 74 flow upward through pipe 86 in heat exchange relation with batch 12 by radiation through pipe 86. This embodiment has the further advantage of protecting the refining agents from adverse reactions with the products of combustion.

Referring now to FIG. 4, there is shown another embodiment of the invention wherein the glass batch is preheated as before with the chemical-refining agents being added to the batch after the preheating stage so that they are not exposed to and adversely affected by the heated combustion atmosphere of the preheater. To this end, the discharge end of preheater kiln 14 is disposed to transfer the batch into a hopper 90 having a screw charger 92 driven by a suitable drive motor 94, the discharge end of charger 92 being located within furnace 16. The electric furnace, rabble, supply batch hopper, preheater kiln, and their associated parts are in this form, identical with the furnace 16, rabble 28, hopper 10, and kiln 14 in the previous form and are assigned like reference numerals. A second hopper 96 containing chemical-refining agents and coloring agents as required, indicated at 98, discharges into a metered screw charger 100 which discharges refining agents 98 into hopper 90 under normal atmosphere. A suitable motor 102 drives metered screw charger 100. A conduit 104 may connect furnace 16 with the lower discharge end of kiln 14 as before or may connect furnace 16 directly with conduit 50 by a suitable valve 106 whereby the effluent furnace gas is utilized to preheat the glass batch. With the foregoing arrangement, the combustion gases provided in preheater kiln 14 by burner 74 and effluent gas from furnace 16 provided through conduit 104 act only on the glass batch with the refining agents 98 being supplied to furnace 16 after the preheating stage and substantially immediately upon their combination with the preheated batch 12 in hopper 90. Refining agents 98 are thus free to oxidize in furnace 16 in the conventional manner without being affected adversely by the preheated batch 12. It will be appreciated that the particular construction of preheater kiln 14 in this embodiment may be any of the three forms illustrated in FIGS. 1-3.

Another form of this aspect of the invention whereby the refining agents are protected against the adverse effects of the preheater kiln 14, resides in the addition of sufficient sulfate to the batch so that not all of the batch is reacted by the combustion gas and the addition of a small amount of amber glass in granulated form to the batch. Amber glass contains a reducing agent, iron sulfide, which can react with sulfate to produce sulfur dioxide at the time of melting. The iron sulfide in the amber glass, however, is sealed in the glass matrix and combustion gases cannot rapidly penetrate the glass, thus preserving the sulfide. Hence, the added sulfate and amber glass may be combined with batch 12 prior to its discharge into preheater kiln 14 and batch 12 may be preheated as in the embodiment illustrated in FIG. 1.

To manufacture amber glass by the foregoing process, conditions in the rotary kiln 14 must be kept reducing in order to retain sufficient of the carbon or coal which is added to the batch to create the reducing conditions during melting which are necessary for amber color formation. Sulfate added to the batch as in the preceding embodiment would only be decomposed by the reducing nature of the combustion products. In this form, a glass (usually colorless) having a sulfate content to be carried into the melt zone for reaction with the excess sulfide formed in the amber color reaction is added to the batch. The reaction of the coloring ingredient in amber glass, iron sulfide, with the residual sulfate in the colorless glass forms the sulfur dioxide for the refining stage, the reducing agents and iron sulfide being provided in excess so that the resulting glass is amber.

While the foregoing preheating methods and limitations are normally employed in the continuous manufacture of glass, the same also may be employed in periodic furnaces. Accordingly, batch is preheated, as before, and stored within an insulated container or barrel (not shown). The entire quantity of preheated batch is then subsequently charged into a day tank with the day tank being recharged at periodic intervals. This method of storing the preheated batch in insulated containers for subsequent charging into a furnace may also be employed in continuous furnaces.

It is thus seen that the objects of my invention are fully accomplished in that a glass-melting furnace assembly has been provided having optimal efficiency (low heat cost per unit weight of glass produced and maximum heat utilized per heat applied). Moreover, an electric furnace has been provided with efficiencies corresponding to the efficiencies realized from conventional fuel-fired glass-melting furnaces. The batch is preheated without any substantial chemical reaction occurring prior to discharge of the batch into the furnace, while simultaneously the batch is maintained in its granular form wherein its heat transfer characteristics are optimal. Moreover, the tumbling of the batch in the preheater kiln, the use of effluent gas in the preheater kiln and/or in the supply hopper, and the introduction of the combustion atmosphere for preheating the batch in the supply hopper are the features of the present invention which contribute to the high overall heat efficiency realized. Additionally, the present invention provides two methods by which the refining agents may be introduced into the furnace without being adversely affected by the preheated combustion atmosphere of the kiln.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for the manufacture of molten glass comprising an electrically heated furnace having charging and discharging openings, a hopper for supplying glass batch to said furnace and having a discharge outlet, an elongated tubular preheater kiln having a batch receiving inlet in communication with the hopper discharge outlet and a batch discharge outlet in communication with said furnace charging opening, a conduit disposed in and substantially coextensive with said kiln, means for advancing the batch along said kiln from said kiln inlet to said kiln outlet, combustion means disposed within said conduit adjacent the lower kiln outlet providing a heated combustion atmosphere in the conduit whereby heat transfer between combustion products in said conduit and the batch in the kiln is accomplished by radiation through said conduit, thereby separating the batch from the combustion atmosphere of the conduit, a second hopper for supplying refining agents to the batch and having a hopper discharge outlet, furnace-charging means in communication with said furnace-charging opening and said kiln outlet, and means for transferring the refining agents from said hopper discharge outlet into said furnace-charging means.

2. Apparatus according to claim 1 wherein said advancing means includes means for rotating said tubular kiln about its longitudinal axis.

3. Apparatus according to claim 1 including means disposed in heat transfer relation to the batch in said hopper, together with means connected between said kiln inlet and said heat transfer means for conducting the gas from the kiln inlet to said first-mentioned means for preheating the glass batch in the hopper.

4. Apparatus according to claim 1 including means disposed in heat transfer relation to the batch in the hopper, together with means connected between said furnace and said heat transfer means for conducting the effluent gas from the furnace directly to said first-mentioned means for preheating the glass batch in the hopper.

5. A process for manufacturing glass in a glass furnace having a melting zone comprising the steps of treating glass batch containing refining agents prior to charging thereof into the furnace by preheating substantially all of the glass batch, controlling the temperature of said preheating step to provide elevated batch temperatures not exceeding 1,500° F. and with a time period such that said batch is maintained in granular form and not over 50 percent of the volatiles are driven off, charging the preheated batch into the furnace and melting the preheated batch in the furnace, said batch containing sufficient sulfate such that not all such sulfate is reduced in the preheating stage, and including the step of adding glass containing a reducing agent in granulated form to the batch prior to preheating the latter whereby the reducing agent in the glass is preserved for reaction with the sulfate in the furnace.

6. The process according to claim 5 wherein the steps of preheating, charging and melting are continuous.

7. The process according to claim 5 wherein said step of preheating the batch is within a time period not greater than 30 minutes.

8. The process according to claim 5 wherein the preheating step heats said batch to temperatures within a range of about 1,200° F. to 1,500° F.

9. The process of claim 5 wherein the step of preheating the batch is accomplished by heating means separate from the furnace-heating means.

10. The process of claim 5 wherein the step of preheating includes passing the effluent gas from the furnace in heat transfer relation with the batch.

11. The process of claim 5 wherein the step of preheating the glass batch is accomplished by combustion heating means separate from the furnace-heating means and including the step of further controlling the temperature such that the exit gases from the preheated batch are maintained above the temperature at which water vapor from the combustion gases of said combustion heating means would condense on the batch in the preheating stage.

12. The process of claim 5 wherein the step of preheating includes passing the effluent gas from the furnace in heat transfer relation with the batch and preheating the batch within a time period of not greater than 30 minutes.

13. The process according to claim 5 wherein the step of preheating includes passing combined effluent and combustion gases from within the furnace in heat transfer relation with the batch.